United States Patent [19]

Sher

[11] Patent Number: 5,533,440
[45] Date of Patent: Jul. 9, 1996

[54] ROTISSERIE

[75] Inventor: Jeffery L. Sher, Mosman, Australia

[73] Assignee: Winmint Manufacturing Pty Limited, New South Wales, Australia

[21] Appl. No.: 386,471

[22] Filed: Feb. 9, 1995

[51] Int. Cl.⁶ .................................................. A47J 37/04
[52] U.S. Cl. ..................... 99/421 HH; 99/447; 99/448; 99/421 H
[58] Field of Search ................ 99/421 H, 421 HV, 99/421 HH, 421 P, 419, 447, 448; 126/92 AC, 91 R; 431/328, 326

[56] References Cited

U.S. PATENT DOCUMENTS

| 839,236 | 12/1906 | Vartanian | 99/421 HV |
| 1,480,119 | 1/1924 | Schey | 9/421 HV |
| 1,630,644 | 5/1927 | Troiel | 99/421 HH |
| 2,636,431 | 4/1953 | Baltz et al. | 99/421 HV |
| 3,273,489 | 9/1966 | Wilson | 99/421 HV |
| 4,504,218 | 3/1985 | Mihara et al. | 431/328 |
| 4,608,012 | 8/1986 | Cooper | 431/328 |

*Primary Examiner*—David Scherbel
*Assistant Examiner*—Reginald L. Alexander
*Attorney, Agent, or Firm*—Staas & Halsey

[57] ABSTRACT

A rotisserie oven includes a plurality of spits spaced one above the other such that the upper spits are staggered slightly forwardly with respect to the lower spits. Each spit is located forward of respective curved heating plates. Fat dripping from rotating chickens falls therefrom, missing chickens therebelow.

20 Claims, 4 Drawing Sheets

ROTISSERIE

FIELD OF THE INVENTION

The following invention relates to a rotisserie. More particularly, though not exclusively, the invention relates to a gas fired charcoal chicken rotisserie for use at charcoal chicken stores.

A problem in known charcoal chicken ovens is that the fat from the cooking chickens drips onto a bed of charcoal therebelow, thus causing excessive smoke production and an adverse effect on the environment.

A further problem with known charcoal chicken ovens is that where chickens are stacked one above another, the lower chickens are contaminated with the fat dripping from the upper chickens.

OBJECT OF THE INVENTION

It is the object of the present invention to overcome at least one of the above disadvantages and/or more generally to provide an improved rotisserie.

DISCLOSURE OF THE INVENTION

There is disclosed herein a rotisserie which includes:

a cabinet, at plurality of horizontally extending spits rotatably supported within the cabinet, such that each respective spit is upwardly, forwardly staggered with respect to a spit therebelow. Additionally, food items mounted upon respective spits are adapted to receive radiant heat from a radiant plate located within the cabinet.

Preferably, receives are positioned below the spits within said cabinet to receive any exudate from said food item during cooking. Preferably, the radiant plates are concave.

Preferably, each radiant plate is adapted to be heated by burning gas.

Preferably, each radiant plate includes a plurality of apexed protrusions evenly located thereon.

Preferably, each apexed protrusion is pyramidal.

Preferably, each spit is rotatably driven by a drive shaft having worm gear means thereon.

Alternatively, each spit is adapted to engage a sprocket and each sprocket is driven by a drive chain attached to a motor.

Preferably, the receivers receive exudate includes a drip tray located below a lowermost spit.

Preferably, the cabinet is also provided with a wood or charcoal burning unit to provide the interior of the cabinet with wood or charcoal smoke during cooking.

Typically, the cabinet also includes a filter box in a chimney flue.

Preferably, the cabinet includes a glass door in front of each spit.

Preferably, gas is provided to each of the radiant plates and optionally to the charcoal burner.

Preferably, gas flow is controlled by gas control knobs on the cabinet.

Preferably, each spit is supported upon a pair of support arms each having a track along which opposed ends of the spit may roll.

Preferably, each support arm includes an indentation to locate the spit in general alignment with one of a plurality of sprockets.

Preferably, each sprocket includes a square (or other appropriately shaped) socket within a tapered recess within which a mating fitting of one end of each respective spit may be received to transfer torque thereto.

Preferably, each spit includes a frusto-conical portion adapted to engage with the recess in the respective support arm to aid in aligning the spit end with the respective socket upon longitudinal transfer of the spit.

Preferably, the other end of the spit is provided with a heat insulative handle to effect longitudinal transfer.

BRIEF DESCRIPTION OF THE DRAWINGS

A preferred form of the present invention will now be described by way of example with reference to the accompanying drawings, wherein.

DESCRIPTION OF THE PREFERRED EMBODIMENT

Figure 1:
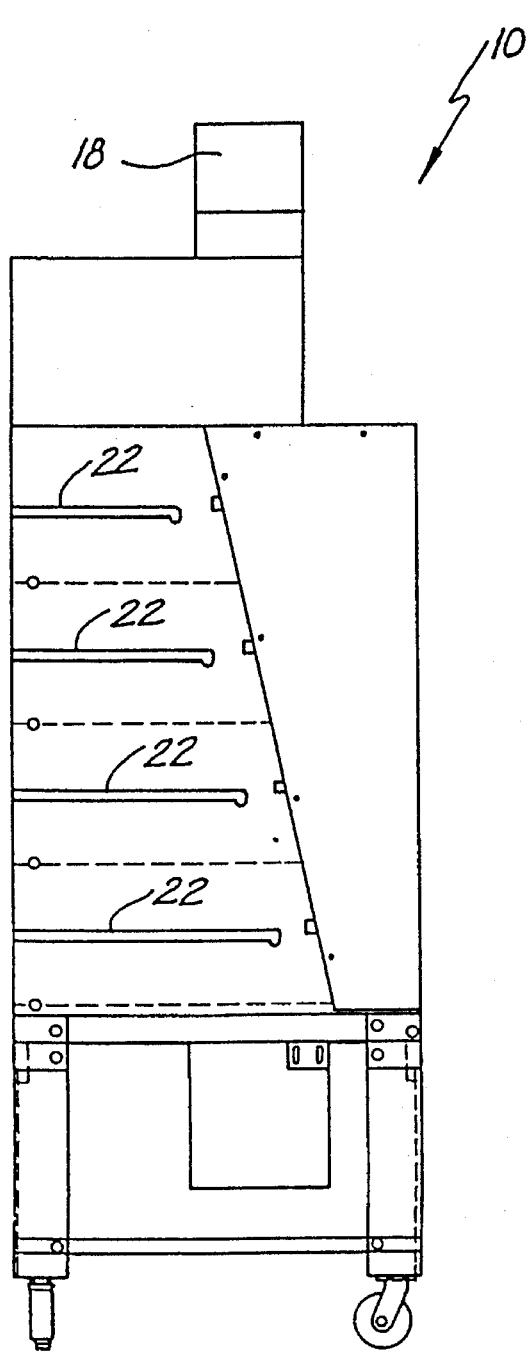
FIG. 1 is a schematic end elevational view of a rotisserie cabinet.
Figure 2:
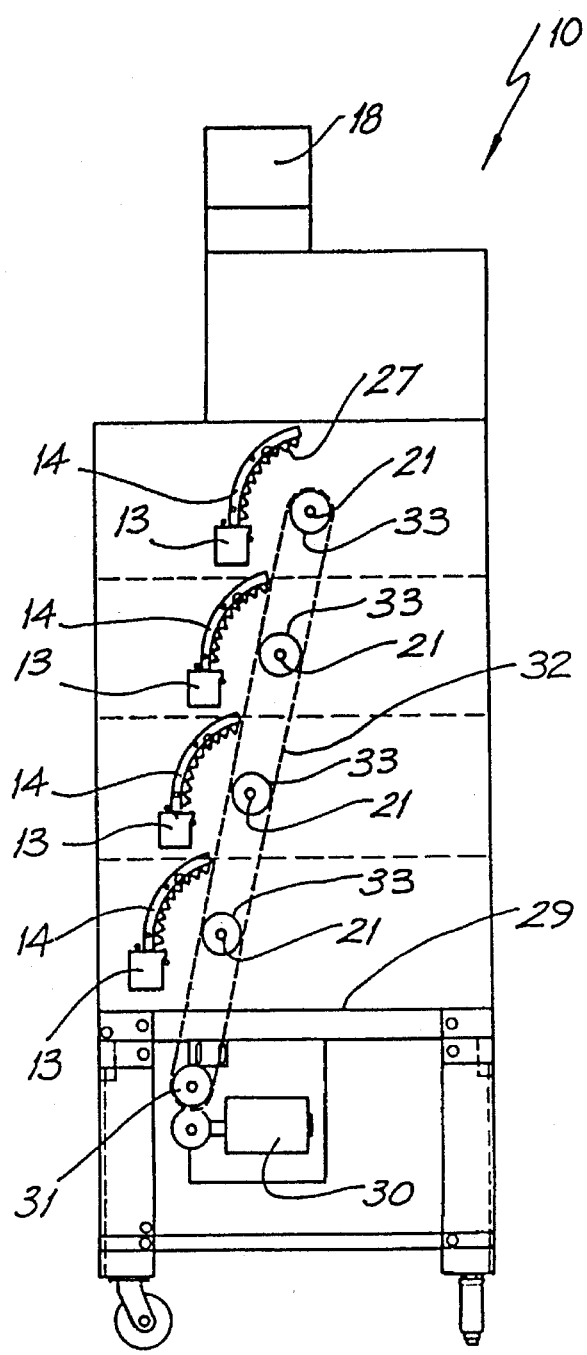
FIG. 2 is a schematic end elevational view of the rotisserie cabinet of FIG. 1 illustrating a drive mechanism and spits to support chickens or other food items thereon.
Figure 3:
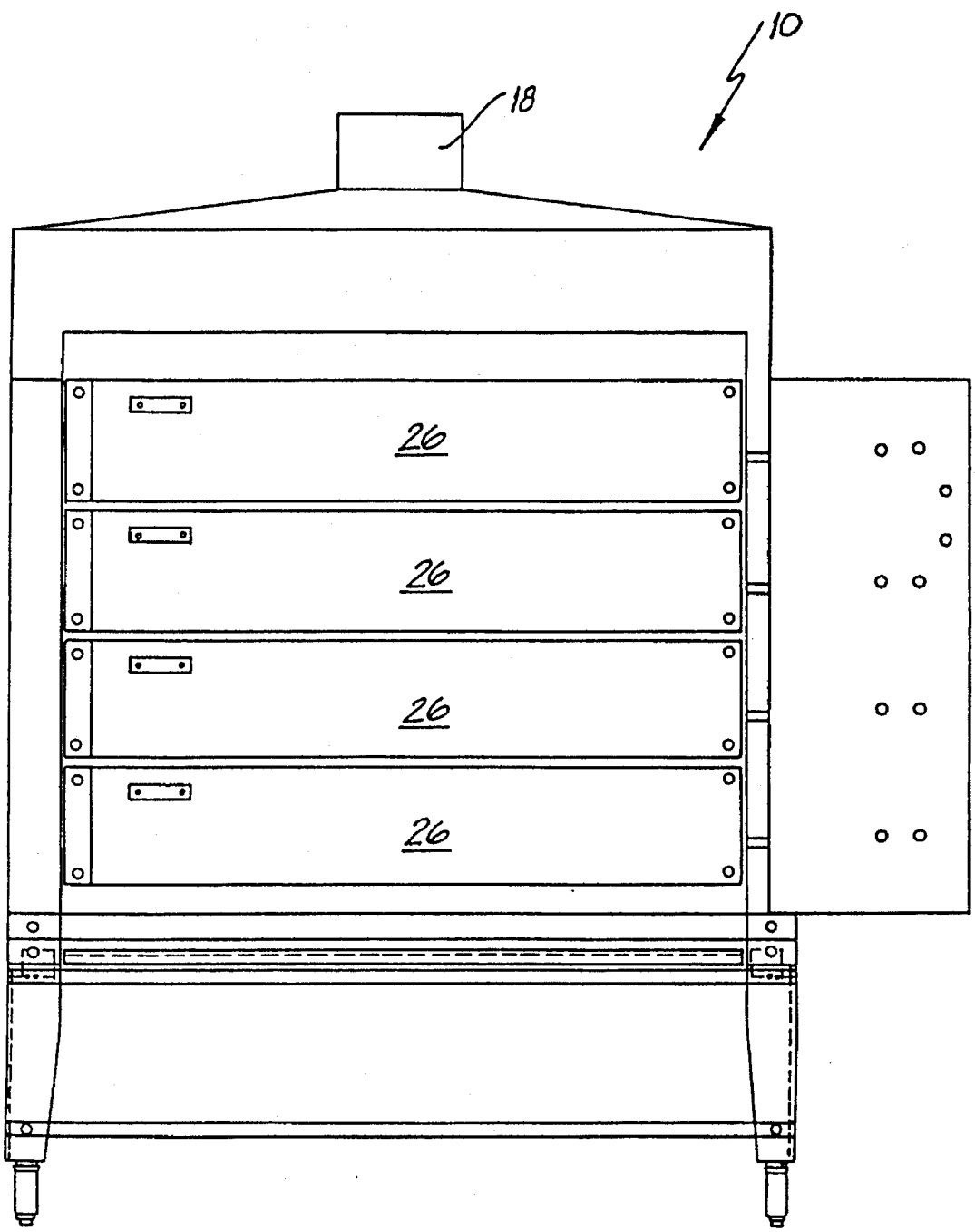
FIG. 3 is a schematic front elevational view of the cabinet of FIGS. 1 and 2.

In the accompanying drawings there is schematically depicted a cabinet or oven 10, typically formed of stainless steel or the like. Referring initially to FIG. 2 there is supported within cabinet 10 a plurality of radiant heating plates 14. Each plate 14 is typically formed of cast iron or aluminum and is concave in form such that a substantial portion of each plate is at a fixed distance from the objects to be cooked. The radiant surface of each radiant plate 14 is provided with a plurality of apexed protrusions 27. Each protrusion 27 is typically in the form of a square pyramid having an apex. Located at the lower end of each radiant plate 14 is a gas burner 13. Each gas burner receives gas via a manifold (not shown).

Also provided within the cabinet 10 is a number of rotationally driven horizontal spits 21. Each spit 21 extends transversely within the cabinet and each is supported by a support arm 22 affixed to the cabinet 10. Each support arm 22 extends at right angles to the longitudinal extent of each spit. That is, each support arm 22 extends frontward-to-backward within the cabinet at each side thereof.

Figure 4:
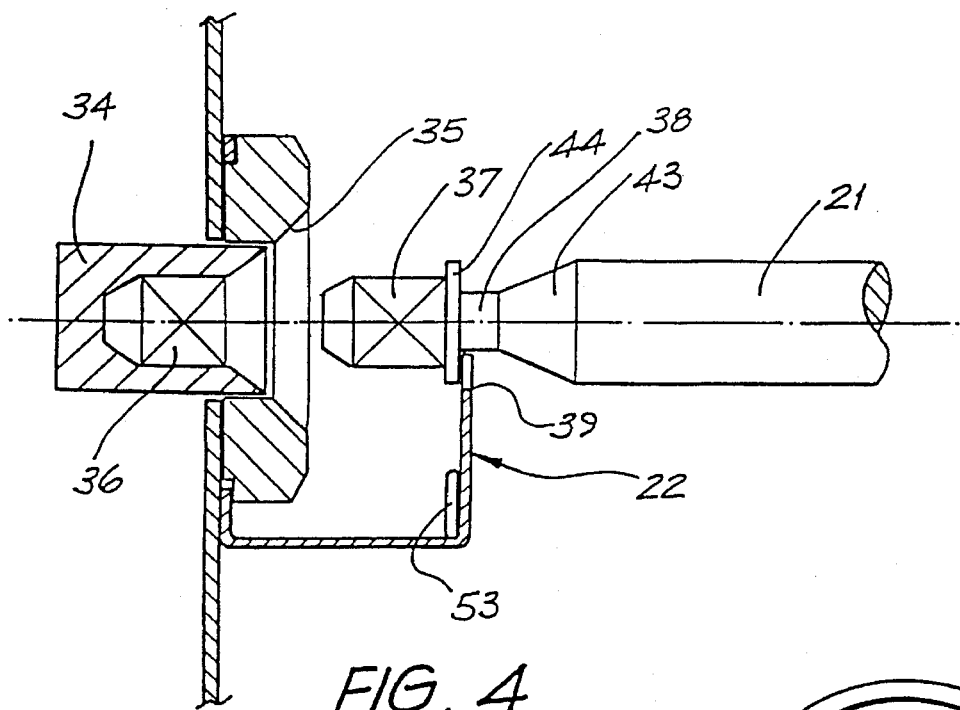
FIG. 4 is a schematic front elevational view of a support arm engageable with the end of a spit.

In order to rotate each spit 21, a motor 30 is provided in the lower portion of the cabinet 10. Motor 30 is adapted by any convenient means to drive a first sprocket 31. Sprocket 31 in turn drives a continuous chain 32 which meshes with a number of sprockets 33. Each sprocket 33 is adapted to engage with or formed integrally with a socket 34 (FIG. 4). Sprockets 33 are supported within the cabinet by suitable bearings.

Figure 5:
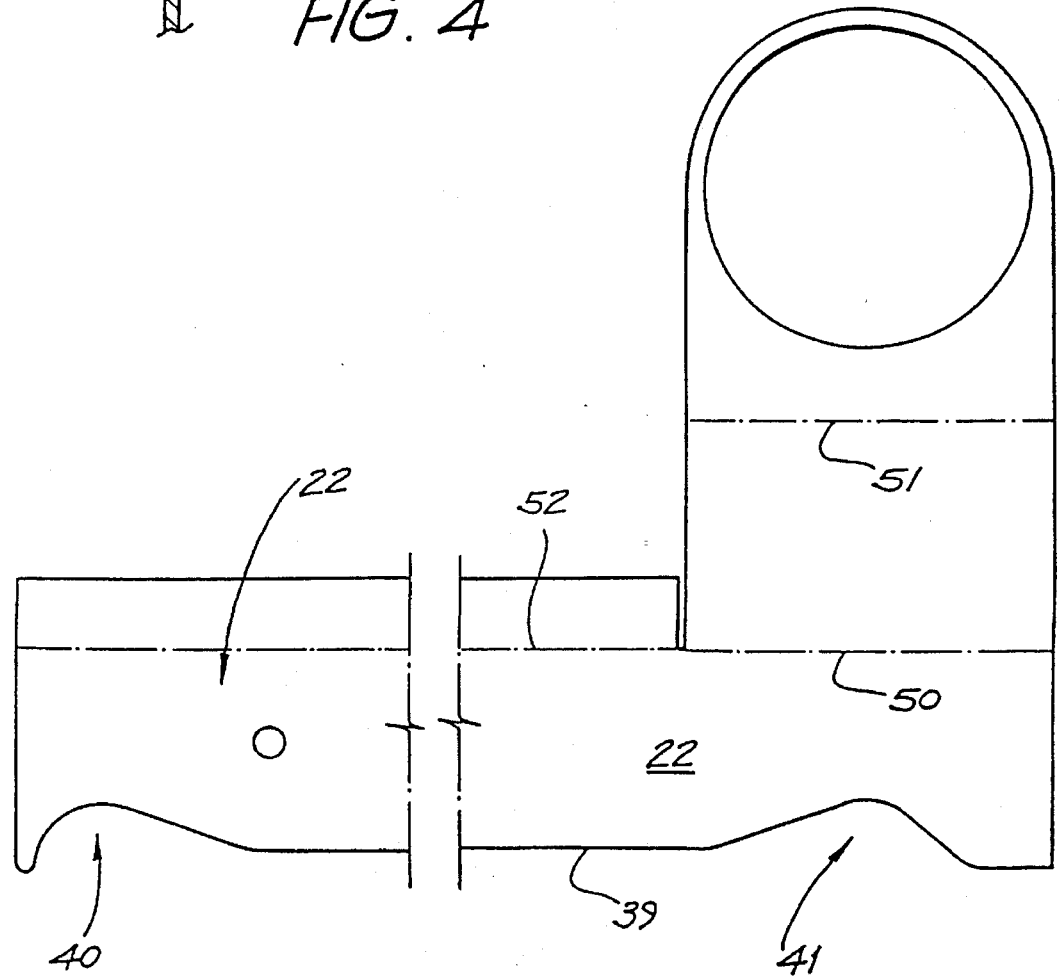
FIG. 5 is a schematic illustration of a steel blank from which the support arm is fabricated.

With reference to FIG. 4, each socket 34 comprises a tapered entry aperture 35 leading to a square, triangular, or any other polygonal recess 36. Recess 36 is adapted to engage a correspondingly shaped boss 37 formed at the end of spit 21. Spit 21 also comprises a rolling surface 38 adapted to roll along the rail 39 of support arm 22. As shown in FIG. 5, support arm 22 comprises a forward indentation 40 and a rearward indentation 41. As the spit 21 is caused to roll along rail 39, and into position nearby socket 34, the indentation 41 prevents the spit 21 from rolling out of position. The indentation 40 at the forward end of the cabinet is merely adapted to maintain the spit in a forward orientation away from the heating plates.

The steel blank illustrated in FIG. 5 from which the support arm 22 is fabricated comprises three fold lines 50, 51 and 52. Fold lines 50, 5 and 51 are folded at right angles to form the configuration depicted in FIG. 4. Fold line 52 is folded through approximately 180' to provide the beam 53 depicting FIG. 4.

Figure 6:
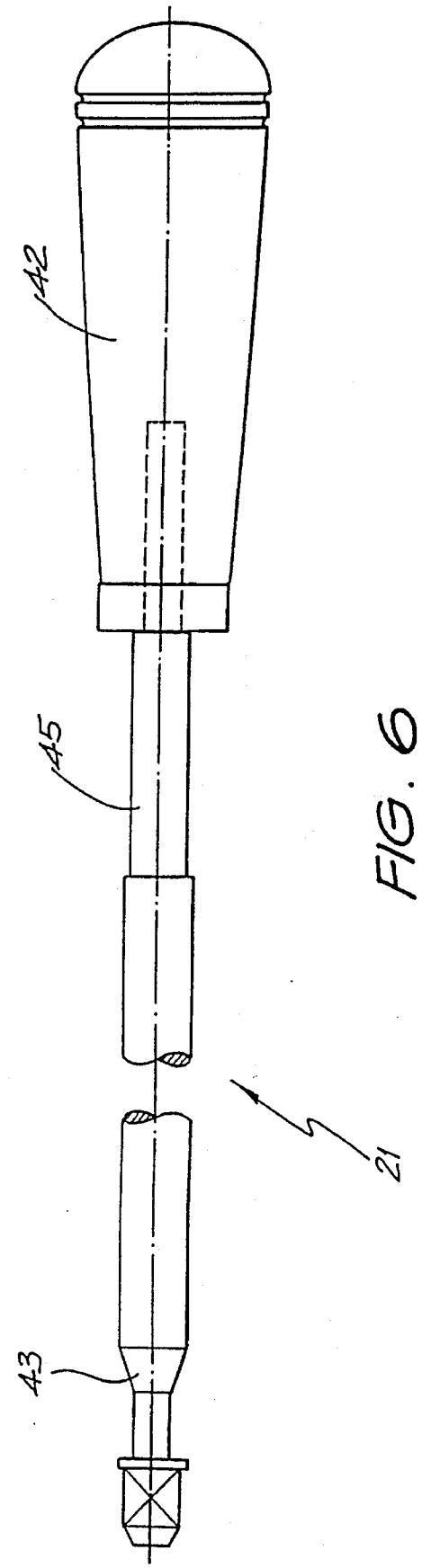
FIG. 6 is a schematic elevational view of a single spit.

With reference to FIG. 6, the other end of each spit 21 is provided with an insulating handle 42, typically formed from wood. Once into position at indentations 41, the spit 21 may be longitudinally transferred by pushing handle 42 so as to cause the spit to ride upwardly as indentation 41 engages with frusto-conical ramp 43. With the motor 30 running, boss 37 will soon align with recess 36 to drivingly engage the spit 21 with motor 30.

As an alternative to the provision of sprockets 33 and drive chain 32, in order to rotate each spit 21, a common drive shaft may be provided. The drive shaft may be mounted at the upper end by a bearing to cabinet 10. At the lower end of the drive shaft, a lower bearing may be provided.

The action of the motor 30 may be transferred to each spit 21 by a worm gear arrangement at one end of each spit co-operating with drive shaft (not shown).

There may also be provided a charcoal or wood burning box which receives gas from a manifold supplying gas to each burner 13. The control of gas to the manifold may be provided by an on/off valve (not shown). At the front of the cabinet 10, glass doors 26 are mounted. Doors 26 may be a hinged or sliding door or otherwise.

At the upper region of the cabinet 10 there is provided a filter box and flue 18. The flue would be connected to a chimney or the like. Also provided as additional means for ventilation might be a ventilation opening near the top of cabinet 10.

In use, radiant heat is directed by radiant plates 14 to chickens or other food items rotationally driven upon spits 21. As the chickens cook, typically at a temperature in the range of 300°–400° C., preferably 350° C., exudate from the chicken or the like drips upon a tray or other catchment means located upon a support surface 29 within the cabinet 10. As an alternative to the provision of such a tray (not shown), any drainage means may be provided. As each chicken is located slightly forward relative to the chicken therebelow, it is intended that exudate would fall from respective chickens directly to the catchment means. As viewed in FIG. 2, it should be appreciated that the preferred rotation direction of the chickens is anticlockwise. That is, dripping fat from each chicken does not necessarily occur at the chicken center line. Observations show that dripping occurs slightly forward of the centerline which in the present invention would result in dripping entirely missing the chickens therebelow.

As illustrated in FIG. 4, each spit 21 also comprises a buffer 44. The buffer 44 is adapted to engage the edge of supporting arm 22 such that the spit loaded with chickens does not fall from the track 39. At the opposite end of each spit 21 nearby handle 42 (FIG. 6), a narrowed section 45 is provided. Narrowed section 45 is adapted to ride upon a semicylindrical bearing alongside a similar support arm. This beating might be lubricated with chicken fat to reduce friction.

Each radiant plate 14 is located slightly forwardly relative to the plate 14 located therebelow. It is envisaged that such would minimize the likelihood of fat from the chicken from igniting as it drips from the chicken.

The apexed protrusions of each concave radiating plate are intended to intensify heat radiation. The pinnacle of each pyramid reaches a much higher temperature than the immediately surrounding metal, thus providing a plurality of high intensity point sources of radiation, each at an essentially fixed distance from the respective spit 21.

The flow of gas to an upper gas burner 13 might be restricted to provide less gas to that burner relative to the burner therebelow. Convection currents from the lower radiating plates would cause self heating of the relatively upper located plates. For this reason, the flow of gas to the upper plates may be progressively restricted relative to the lower burners.

It should be appreciated that modifications and alterations obvious to those skilled in the art are not to be considered as beyond the scope of the present invention. For example, the oven 10 might comprise a series of modular sub-sections each comprising a cooker 14 and spit 21. That is, further modules might be added or removed.

What I claim is:

1. A rotisserie comprising:

a cabinet;

pairs of support arms located within said cabinet;

a radiant plate supplying radiant heat inside said cabinet;

a plurality of horizontally extending spits rotatably supported within said cabinet, each one of said respective spits being upwardly, forwardly staggered with respect to a spit therebelow, each spit being supported upon a pair of said support arms, each one of said support arms comprising a track along which opposed ends of each said spit may roll, food items mounted upon respective spits are adapted to receive radiant heat from said radiant plate located within said cabinet each said track being fixed to said cabinet.

2. The rotisserie of claim 1 further comprising means positioned below the spits within said cabinet to receive any exudate from said food item during cooking.

3. The rotisserie of claim 1 wherein the radiant plates are concave.

4. The rotisserie of claim 1 wherein each radiant plate is adapted to be heated by burning gas.

5. The rotisserie of claim 1 wherein each radiant plate comprises a plurality of apexed protrusions evenly located thereon.

6. The rotisserie of claim 5 wherein each apexed protrusion is pyramidal.

7. The rotisserie of claim 1 wherein each spit is rotatably driven by a drive shaft having worm gear means thereon.

8. The rotisserie of claim 1 wherein each spit is adapted to engage, a sprocket and each sprocket is driven by a drive chain attached to a motor.

9. The rotisserie of claim 2 wherein said means to receive exudate comprises a drip tray located below a lower-most spit.

10. The rotisserie of claim 1 wherein said cabinet is provided with a wood or charcoal bunting means to provide the interior of the cabinet with wood or charcoal smoke during cooking.

11. The rotisserie of claim 1 wherein the cabinet comprises a filter box in a chimney flue.

12. The rotisserie of claim 1 wherein the cabinet comprises a glass door in front of each spit.

13. The rotisserie of claim 1 comprising gas supply means to provide each of the radiant plates with gas.

14. The rotisserie of claim 13 wherein gas flow is controlled by gas control knobs on the cabinet.

15. The rotisserie of claim 1 wherein each support arm comprises an indentation to locate the spit in general alignment with one of a plurality of sprockets.

16. The rotisserie of claim 15 wherein each sprocket comprises a socket within a tapered recess within which a mating fitting of one end of each respective spit may be received to transfer torque thereto.

17. The rotisserie of claim 16 wherein each spit comprises a frusto-conical portion adapted to engage with the recess in the respective support arm to aid in aligning the spit end with the respective socket upon longitudinal transfer of the spit.

18. The rotisserie of claim 17 wherein the other end of the spit is provided with a heat insulative handle to effect longitudinal transfer.

19. The rotisserie of claim 2 wherein the radiant plates are concave.

20. The rotisserie of claim 16 wherein said socket is a square.

* * * * *